(12) United States Patent
Kemnitz et al.

(10) Patent No.: US 8,181,623 B2
(45) Date of Patent: May 22, 2012

(54) PISTON FOR AN INTERNAL COMBUSTION ENGINE

(75) Inventors: Peter Kemnitz, Leutenbach (DE); Klaus Keller, Lorch (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/134,480

(22) Filed: Jun. 8, 2011

(65) Prior Publication Data

US 2011/0232480 A1 Sep. 29, 2011

Related U.S. Application Data

(62) Division of application No. 12/086,797, filed as application No. PCT/DE2006/002257 on Dec. 15, 2006, now abandoned.

(30) Foreign Application Priority Data

Dec. 21, 2005 (DE) ....................... 10 2005 061 063.3

(51) Int. Cl.
*F16J 1/08* (2006.01)
(52) U.S. Cl. .................................................... 123/193.6
(58) Field of Classification Search ............... 123/193.6; 92/187, 223; 29/888.048
See application file for complete search history.

(56) References Cited

U.S. PATENT DOCUMENTS

| | | | |
|---|---|---|---|
| 4,775,555 A * | 10/1988 | Duffy ............................ | 427/183 |
| 5,746,169 A | 5/1998 | Issler et al. | |
| 6,273,612 B1 | 8/2001 | Ono et al. | |
| 6,303,232 B1 | 10/2001 | Mihoya et al. | |
| 6,435,077 B1 | 8/2002 | Damour et al. | |
| 6,540,403 B1 | 4/2003 | Damour | |
| 6,557,457 B1 * | 5/2003 | Hart et al. ....................... | 92/223 |
| 6,568,918 B2 * | 5/2003 | Sugioka et al. ............... | 417/269 |
| 7,152,567 B2 | 12/2006 | Anderson et al. | |
| 7,278,390 B2 | 10/2007 | Fezer | |
| 7,475,212 B2 | 1/2009 | Mischo | |
| 2004/0221715 A1 * | 11/2004 | Murase et al. .................... | 92/70 |
| 2008/0156185 A1 | 7/2008 | Perrone | |
| 2008/0223211 A1 | 9/2008 | Maier et al. | |
| 2009/0078080 A1 | 3/2009 | Kemnitz et al. | |

FOREIGN PATENT DOCUMENTS

| | | |
|---|---|---|
| DE | 1 237 838 | 11/1962 |
| DE | 2 046 862 | 3/1972 |
| DE | 29 21 952 | 12/1980 |

(Continued)

OTHER PUBLICATIONS

International Search Report of PCT/DE2006/002257, Apr. 24, 2007.

*Primary Examiner* — M. McMahon
(74) *Attorney, Agent, or Firm* — Collard & Roe, P.C.

(57) ABSTRACT

A piston for an internal combustion engine has at least two hub bores for holding a piston pin. The hub bores are formed with a cylindrical inner contour and are provided with a coating comprising a resin with solid lubricant particles embedded therein. The coating forms at least one geometric deviation from the cylindrical inner contour of the hub bores. A method for producing a piston of the type, includes producing bores with a cylindrical inner contour and applying a coating medium comprising a resin with solid lubricant particles embedded therein to the inner faces of the bores by a coating tool, such that the resulting coating forms at least one geometric deviation from the cylindrical inner contour of the hub bores.

10 Claims, 2 Drawing Sheets

FOREIGN PATENT DOCUMENTS

| | | |
|---|---|---|
| DE | 36 00 749 | 7/1987 |
| DE | 36 09 019 | 9/1987 |
| DE | 41 11 368 | 1/1992 |
| DE | 197 04 224 | 8/1997 |
| DE | 198 51 711 | 7/1999 |
| DE | 198 28 847 | 2/2000 |
| DE | 199 43 945 | 3/2001 |
| DE | 199 52 097 | 5/2001 |
| DE | 102 55 731 | 6/2004 |
| DE | 10 2004 018 921 | 11/2005 |
| DE | 10 2004 059 392 | 6/2006 |
| DE | 10 2005 055 365 | 6/2006 |
| FR | 1 300 937 | 6/1961 |
| GB | 1 306 470 | 2/1973 |
| JP | 11-033700 | 2/1999 |
| WO | WO 96/07841 | 3/1996 |
| WO | WO 2004/051119 | 6/2004 |
| WO | WO 2004/070238 | 8/2004 |

* cited by examiner

PISTON FOR AN INTERNAL COMBUSTION ENGINE

CROSS REFERENCE TO RELATED APPLICATIONS

This application is a divisional of and Applicants claim priority under 35 U.S.C. §§1.20 and 121 on U.S. application Ser. No. 12/086,797 filed on Jun. 19, 2008, which application is a national stage application under 35 U.S.C. §371 of PCT Application No. PCT/DE2006/002257 filed Dec. 15, 2006, which claims priority under 35 U.S.C. §119 from German Patent Application No. 10 2005 061 063.3 filed Dec. 21, 2005, the disclosures of each of which are hereby incorporated by reference.

BACKGROUND OF THE INVENTION

The invention relates to a piston for an internal combustion engine and to a method for its production.

The piston pin connects the piston with the crankshaft of the internal combustion engine by way of a connecting rod. The piston pin is mounted in pin bores made in pin bosses, and can bend as a result of the tremendous forces that act on the piston during the oscillating movement of the piston. The pin bosses are among the parts of a piston that are subject to the greatest stress. Under great piston stresses, there is the risk of crack formation at the pin bores. Therefore, ways are being sought to relieve stress on the pin bores, particularly in light-metal pistons. This is done, for example, by means of local geometric changes in the usually cylindrical pin bore, which reduce the stress triggered by the deformation of the piston pin. Such geometric changes can be, for example, stress relief pockets, oval pin bores, or conical or spherical bores adapted to the bending line of the piston pin (with regard to the latter see, for example, WO 96/07841 A1). Such geometric changes have been produced by means of complicated precision machining of the pin bore until now.

Pistons having pin bores with slide bearing surfaces are known from German patent application 10 2004 059 392.9. The slide bearing surfaces are coated with a self-lubricating coating made of a resin with solid lubricant particles embedded in it.

SUMMARY OF THE INVENTION

It is the task of the present invention to make available a piston whose pin bores can be provided with local geometric deviations in particularly simple manner.

The solution consists in a piston in which the pin bores are formed from bores having a cylindrical inside contour. The bores are provided with a coating comprising a resin with solid lubricant particles embedded in it, and the coating forms at least one geometric deviation from the cylindrical inside contour of the pin bores. In the method according to the invention, first, bores having a cylindrical inside contour are produced, and subsequently, a coating agent comprising a resin with solid lubricant particles embedded in it is applied to the inside surfaces of this bore, by means of a coating tool, so that the resulting coating forms the at least one geometric deviation from the cylindrical inside contour of the pin bores.

With the present invention, it is possible to produce pin bores having at least one geometric deviation from the cylindrical inside contour, and having a self-lubricating coating of their inside surfaces, in one and the same work step. This means a significant saving in time and costs. The complicated and very complex cutting machining of the metallic inside surfaces of the pin bores for the purpose of introducing a geometric deviation is eliminated. Furthermore, bearing bushings are no longer necessary to achieve sufficient lubrication and an anti-seizure effect of the pin bores. The desired dimensional accuracy of the pin bores is reliably achieved. The strength and therefore the useful lifetime of the piston pin bearing are significantly improved, as a result of the improved lubrication properties as compared with the previously known coatings made of metal alloys.

The at least one geometric deviation can be configured as at least one stress-relief pocket and/or ovality (for example as a heightwise or crosswise ovality) and/or as a shaped bore, as it is disclosed in WO 96/07841 A1, for example.

In an advantageous manner, at least one oil collection chamber can be provided in the coating, in order to further improve the lubrication of the piston pin bearing. The at least one oil collection chamber can be configured as a channel that runs in the pin boss axis direction, as a channel that runs radially with regard to the pin boss axis direction, surrounding it entirely or in part, and/or as a pocket-shaped recess.

The minimum thickness of the coating depends on the requirements of the individual case and can amount to 5 µm to 15 µm, for example.

Preferably, the resin contained in the coating is a thermally cured resin, particularly a polyamide resin, which is very temperature-resistant and can withstand the stresses that the piston pin bearing is subject to in operation particularly well.

It has been shown that a proportion of 50 wt.-% to 60 wt.-% of solid lubricant particles in the coating has particularly good lubrication properties. In this connection, the solid lubricant particles can particularly consist of a material that is selected from the materials group that comprises graphite, molybdenum sulfide, tungsten disulfide, hexagonal boron nitride, and PTFE (polytetrafluoroethylene). In this connection, it is advantageous if the solid lubricant particles consist of only one material. It is particularly advantageous if all the solid lubricant particles consist of the same material, or if solid lubricant particles that consist of two different materials are mixed, for example solid lubricant particles of graphite with solid lubricant particles of a metal sulfide. For particularly effective lubrication, the solid lubricant particles have a particle size of 1 µm to 3 µm.

In the method according to the invention, the at least one geometric deviation can be configured by means of varying the amount of the coating agent given off by the coating tool and/or by means of varying the advance of the coating tool in the bore to be coated.

A possible alternative, of course, consists in applying the coating agent in a uniform thickness and configuring the at least one geometric deviation by means of subsequent working of the resulting coating. Of course, this is significantly more complicated than making the at least one geometric deviation directly during the coating process. However, the result, namely a piston having pin bores whose coating forms the at least one geometric deviation from the cylindrical inside contour of the pin bores, is the same.

In one embodiment, the coating agent is applied to inside surfaces of the bores with a surface roughness of Ra (average roughness value) $\leq 0.8$ µm.

In another embodiment, the coating agent is applied by means of rotation atomization from a rotating nozzle introduced into the bore.

In another embodiment, the rotation atomization is carried out at a rotation speed of the nozzle of 14,000 to 18,000 rotations per minute.

In order to further improve the adhesion of the coating agent to the inside surface of the bore, the inside surfaces of the bores can be pre-heated before and/or during application of the coating agent, preferably up to a temperature of 50° C. to 80° C.

A preferred further development of the method according to the invention consists in using a thermally curing coating agent and subjecting the same to heat treatment immediately after completing the application, preferably at a temperature of 200° C.

BRIEF DESCRIPTION OF THE DRAWINGS

An exemplary embodiment of the invention will be described in greater detail below, using the attached drawings. These show, in a representation not to scale.

DETAILED DESCRIPTION OF THE EMBODIMENTS

Figure 1:
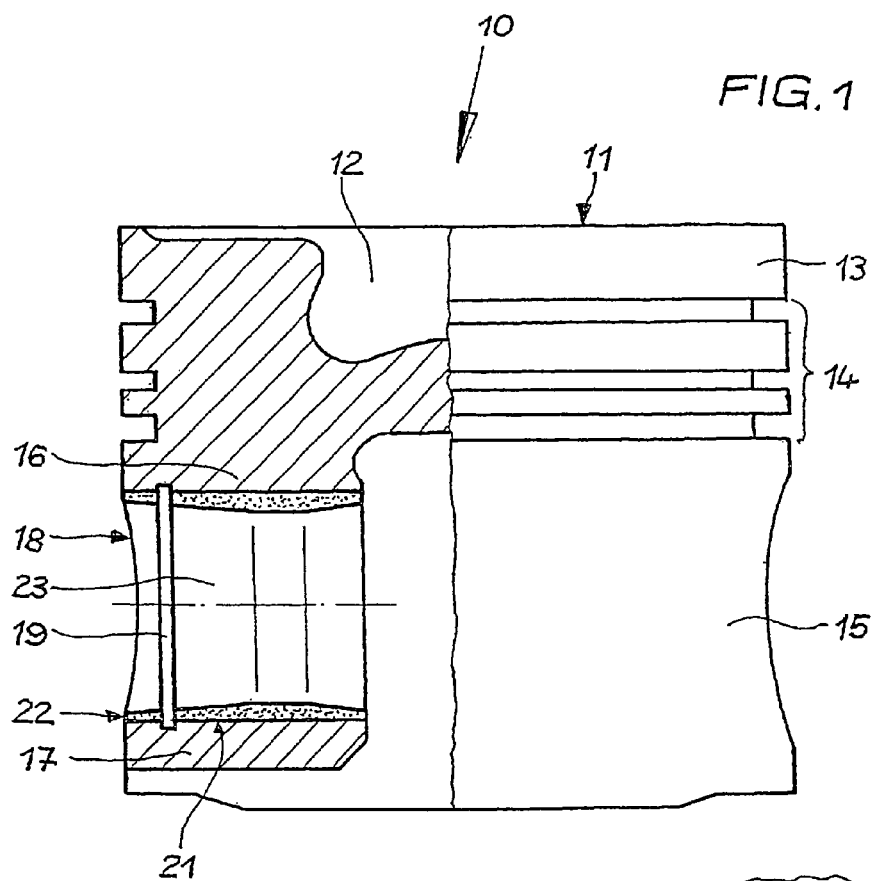
FIG. 1 a representation, partly in section, of an embodiment of a piston according to the invention.
Figure 2:
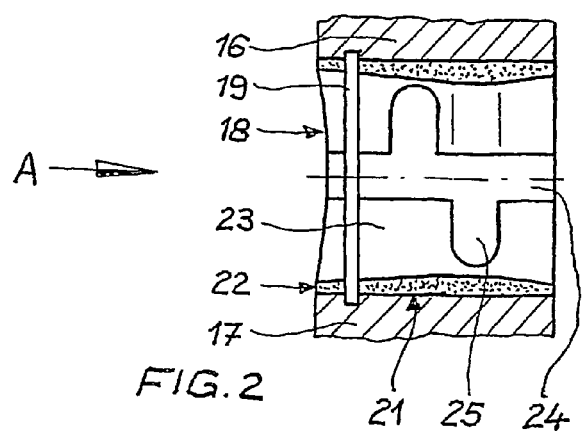
FIG. 2 a partial representation of the pin bore of the piston according to FIG. 1, in section.
Figure 3:
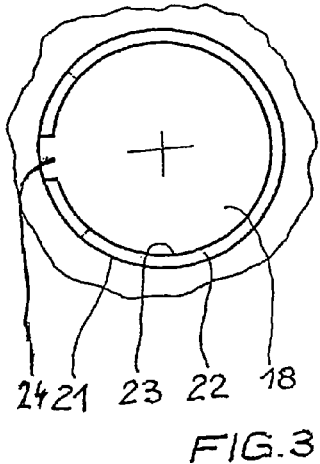
FIG. 3 a view of the pin bore according to FIG. 2 in the direction of the arrow A in FIG. 2.
Figure 4:
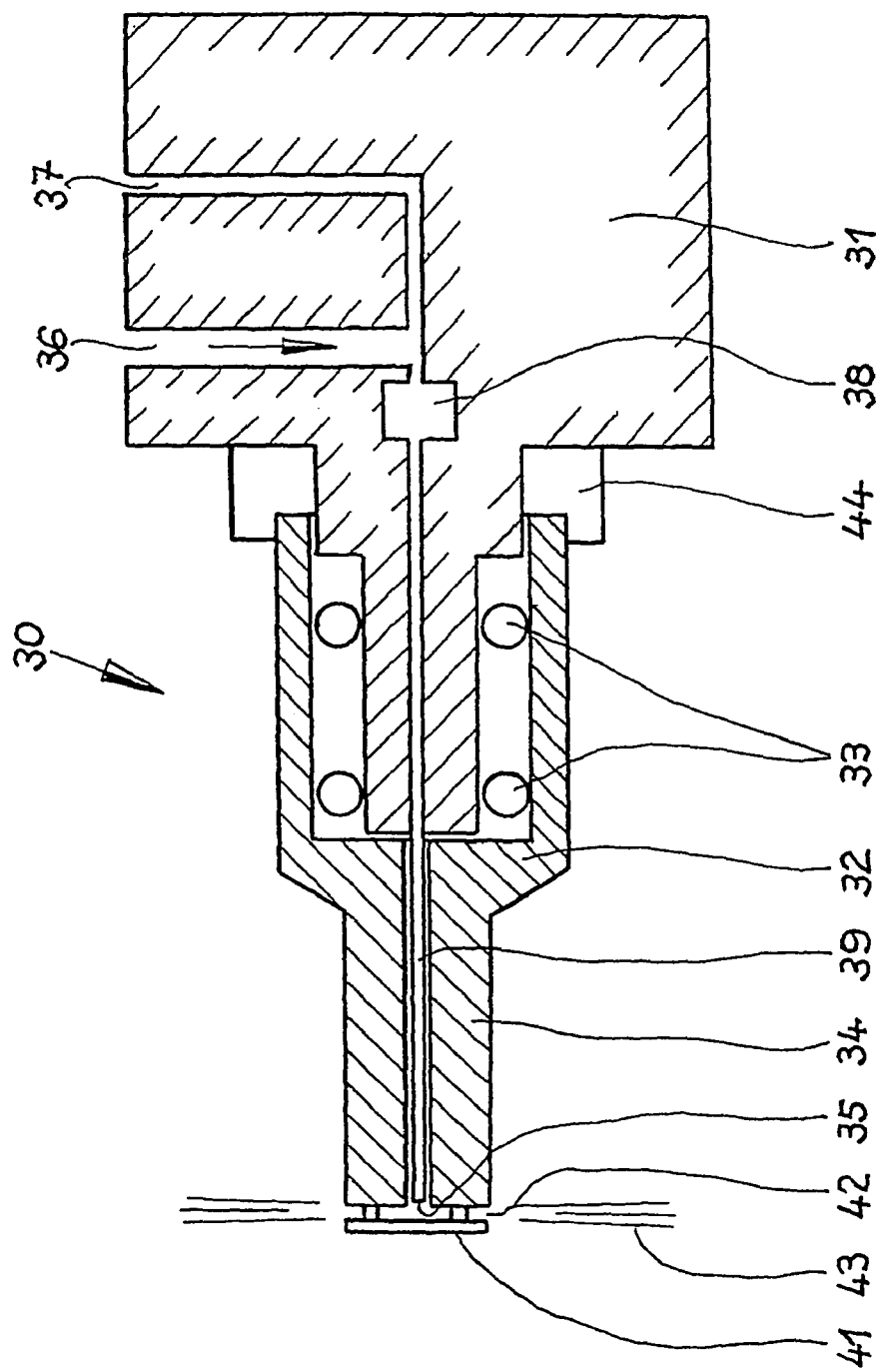
FIG. 4 a schematic representation of a coating tool.

FIG. 1 shows an exemplary embodiment of a piston 10 according to the invention, which is a one-part piston 10 in this case. The piston 10 consists, in known manner, of a light-metal alloy, for example. The piston 10 has a piston head 11 having a combustion bowl 12 and a ring-shaped circumferential side wall having a top land 13 and a ring belt 14 for accommodating piston rings (not shown). The piston 10 has a piston skirt 15 further below the piston head 11. The piston skirt 15 has two pin boss connections 16 that support themselves on the underside of the piston head 11, which make a transition into two piston pin bosses 17. Each piston pin boss is provided with a pin bore 18 equipped with a locking ring groove 19 for a piston ring (not shown). Depending on the construction of the piston (two-part or multi-part), of course, more than two piston pin bosses with corresponding pin bores can be provided.

In the exemplary embodiment, the pin bores 18 are shaped bores having a defined inside contour 23 that deviates from the cylinder shape, as they are disclosed, for example, in WO 96/07841 A1. This configuration serves to relieve stress on the piston pin during operation, in order to avoid the risk of pin boss cracks. Other configurations of a pin bore that serve the same purpose are, for example, pin bores provided with ovality (heightwise and/or crosswise) or with stress relief pockets (not shown). These configurations are known.

The pin bores 18 are configured, according to the invention, in such a manner that they are composed of a cylindrical bore 21 and a coating 22. In this connection, the surface contour of the coating 22 is structured in such a manner that the desired inside contour 23 of the shaped bore, which deviates from the cylinder shape, is obtained. In comparable manner, ovality or a stress relief pocket can also be formed by the surface structure of the coating 22 (not shown). The coating 22 essentially consists of a resin with solid lubricant particles embedded in it, and is thus a self-lubricating coating.

In the exemplary embodiment, the coating is furthermore provided with oil collection chambers in the form of a channel 24 that extends in the direction of the pin boss axis, from which pockets 25 extend radially. These oil collection chambers serve to further improve the lubrication of the piston pin bearing. Of course, they can be configured for any desired application, in any desired shape and size, and can be disposed relative to one another in any desired form.

To produce a pin bore 18, first the cylindrical bore 21 is made in the piston pin boss 17, and mechanically finished in known manner. The surface roughness Ra (average roughness value) can correspond to the one indicated in DE 41 11 368 A1, whereby in general, the Ra values amount to 0.63 µm or less for bore diameters of less than 30 mm, and Ra values of 0.8 µm or less are achieved for bore diameters between 30 mm and 60 mm. In the exemplary embodiment, the bore diameter is selected, before coating, in such a manner that the piston pin has a diametral play of 10 µm to 40 µm in the finished pin bore 18. The cylindrical bore 21 should be cleaned in such a manner that chips, other particles, machining oils and the like are completely removed. The inside surface of the cylindrical bore 21 can also be phosphatized.

If additional oil collection chambers, for example in the form of channels 24 or pockets 25, are supposed to be provided, corresponding cover templates are affixed in the cylindrical bore 21 before coating takes place, in known manner. The cover templates prevent coating of the covered region of the cylindrical bore 21. As an alternative, the finished coating can subsequently be worked, and can be provided with oil collection chambers in this way.

The coating agent selected in the exemplary embodiment is formed from a thermally curable resin with solid lubricant particles of one or more of the materials graphite, molybdenum sulfide, tungsten disulfide, hexagonal boron nitride, and PTFE embedded in it. In the exemplary embodiment, the resin is a very temperature-resistant polyamide imide, and the solid lubricant is a mixture of molybdenum sulfide and graphite particles having a particle size of 1 µm to 3 µm. In the exemplary embodiment, the amount of the solid lubricant is selected in such a manner that the finished coating contains about 50 to 60 wt.-% solid lubricant particles. The viscosity of the coating agent is adjusted in such a manner that droplet formation is prevented in the case of sufficient application.

A device 30 for rotation atomization serves to apply the coating to the inside surface of the cylindrical bore 21, in the exemplary embodiment. The device 30 has a base body 31 that is connected with a nozzle body 32. The nozzle body 32 is mounted to rotate on the base body, by means of a bearing 33. The nozzle body 32 is with a nozzle 34 having an exit opening 35. The base body 31 possesses feed channels 36, 37, in each instance, which are intended for the liquid coating material and for compressed air, and end in a mixing chamber 38 for mixing and metering. An exit channel 39 extends from the mixing chamber 38, through the nozzle body 32, and opens into the exit opening 35. A baffle plate 41 is disposed perpendicular to the exit opening 35, so that a ring-shaped gap 42 having a width of 0.5 mm in the exemplary embodiment is formed between the baffle plate 41 and the nozzle body 32. The coating agent/air mixture exits through the gap 42, in the form of a spray jet 43, radially and at a distance from the nozzle body 32.

The nozzle body 32 is put into rotation by means of a drive 44, and rotates in the speed of rotation range from 14,000 to 18,000 rotations per minute in the exemplary embodiment. The coating agent/air mixture that exits from the exit opening 35 is accelerated by the centripetal forces that occur at the exit opening 35, in such a manner that it exits radially as a disk-shaped spray jet 43. Since the spray jet 43 is configured narrow in the pin axis direction, the inside surface of the cylindrical bore 21 that is to be coated can be sharply delimited, in the pin axis direction, by means of simple feed control of the coating agent/air mixture. In the exemplary embodiment, nozzles 34 having a diameter in the range between 5 and 25 mm and having depths up to 50 mm are available, so that it is possible to coat cylindrical bores 21 for pistons of all engine types with the device 30. The diameter of the nozzle 34 is generally selected in such a manner that it approximately corresponds to half the diameter of the cylindrical bore 21.

A centrifuge device S-520 from Sprimag in Kirchheim is also suitable for carrying out the coating method.

In the exemplary embodiment, application of the coating agent/air mixture takes place onto the inside surface of the cylindrical bore 21, which has been pre-heated to 50° C. to 80° C. The nozzle 34 is introduced centrally into the cylindrical bore 21, from the outside to the inside. To configure the geometric deviation from the cylindrical inside contour, for example of the shaped bore shown in FIG. 1, the advance of the nozzle 34 is varied in a range of 10 to 20 mm/s, for example. In addition or as an alternative, the amount of the coating agent/air mixture exiting from the exit opening 35 of the nozzle 34 can be varied. For this purpose, it is practical that the device 30 works with computer control. When the nozzle 34 has reached the end of the cylindrical bore 21, the device 30 is turned off and retracted.

If cover templates are provided in the cylindrical bore 21 to produce oil collection chambers, the feed of the coating agent/air mixture is shut off when such a template is reached, so that residues of the spray jet are sprayed onto the cover template. When the end of the cover template has been reached, the feed of the coating agent/air mixture is achieved again.

When the coating agent has been applied, it is thermally hardened, in that the piston, i.e. the piston component that has the coated pin bores 18 is placed in an oven and held at a temperature of 200° C. between 10 and 20 minutes there, in the exemplary embodiment.

The finished coating 22 is approximately 5 µm to 20 µm thick at its thinnest point, and the diametral pin play is about 10 µm to 20 µm. This close play is particularly advantageous for avoiding noises caused by pin ticks. The coating 22 furthermore guarantees that despite the close play, no seizing occurs.

What is claimed is:

1. A piston for an internal combustion engine, having at least two pin bores for accommodating a piston pin, the bores having a cylindrical inside contour, wherein the bores are provided with a coating comprising a resin with solid lubricant particles embedded in the coating, wherein the coating forms at least one geometric deviation from the cylindrical inside contour of the pin bores;

wherein the inside surface of the bores is provided with a coating by means of rotation atomization with a coating tool, the coating being a thermally cured resin with solid lubricant particles embedded therein;

wherein the at least one geometric deviation is formed by a stress relief pocket, ovality or shaped bore, and wherein the at least one geometric deviation from the cylindrical outside contour is configured by varying the amount of the resin with solid lubricant particles given off by the coating tool and/or by varying an advance of the coating tool.

2. The piston according to claim 1, wherein at least one oil collection chamber is provided in the coating.

3. The piston according to claim 2, wherein the at least one oil collection chamber is configured as a channel that runs in the pin boss axis direction.

4. The piston according to claim 2, wherein the at least one oil collection chamber is configured as a channel that runs radially relative to a pin boss axis direction, surrounding the pin boss axis entirely or in part.

5. The piston according to claim 2, wherein the at least one oil collection chamber is configured as a pocket-shaped recess.

6. The piston according to claim 1, wherein a minimum thickness of the coating amounts to 5 µm to 20 µm.

7. The piston according to claim 1, wherein the resin is polyamide imide resin.

8. The piston according to claim 1, wherein the coating contains 50 wt.-% to 60 wt.-% solid lubricant particles.

9. The piston according to claim 1, wherein the solid lubricant particles consist of a material selected from the group consisting of graphite, molybdenum sulfide, tungsten disulfide, hexagonal boron nitride, and PTFE (polytetrafluoroethylene).

10. The piston according to claim 1, wherein the solid lubricant particles have a particle size of 1 µm to 3 µm.

* * * * *